US011550388B2

(12) United States Patent
Eash et al.

(10) Patent No.: US 11,550,388 B2
(45) Date of Patent: Jan. 10, 2023

(54) SENSOR-BASED EYE-TRACKING USING A HOLOGRAPHIC OPTICAL ELEMENT

(71) Applicant: Avegant Corp., San Mateo, CA (US)

(72) Inventors: Aaron Matthew Eash, San Francisco, CA (US); Andrew John Gross, Chassell, MI (US); Christopher David Westra, San Carlos, CA (US); Warren Cornelius Welch, III, Foster City, CA (US); Eric Richard David Frasch, San Francisco, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

(21) Appl. No.: 17/449,942

(22) Filed: Oct. 4, 2021

(65) Prior Publication Data
US 2022/0100269 A1 Mar. 31, 2022

Related U.S. Application Data

(63) Continuation of application No. 16/737,840, filed on Jan. 8, 2020, now Pat. No. 11,181,979.

(60) Provisional application No. 62/789,881, filed on Jan. 8, 2019.

(51) Int. Cl.
*G02B 5/32* (2006.01)
*H04N 5/33* (2006.01)
*G06F 3/01* (2006.01)
*G02B 5/20* (2006.01)

(52) U.S. Cl.
CPC ............ *G06F 3/013* (2013.01); *G02B 5/208* (2013.01); *G02B 5/32* (2013.01); *H04N 5/33* (2013.01)

(58) Field of Classification Search
CPC ........... G06F 3/013; G02B 5/208; G02B 5/32; H04N 5/33
See application file for complete search history.

(56) References Cited

U.S. PATENT DOCUMENTS

| | | | |
|---|---|---|---|
| 6,322,216 | B1 | 11/2001 | Yee et al. |
| 2001/0043163 | A1 | 11/2001 | Waldern et al. |
| 2002/0167462 | A1 | 11/2002 | Lewis et al. |
| 2015/0185475 | A1 | 7/2015 | Saarikko et al. |
| 2016/0033771 | A1 | 2/2016 | Tremblay et al. |
| 2016/0085300 | A1 | 3/2016 | Robbins et al. |
| 2016/0242643 | A1 | 8/2016 | Sprehn |
| 2016/0379606 | A1 | 12/2016 | Kollin et al. |
| 2017/0115483 | A1 | 4/2017 | Aleem et al. |
| 2018/0003961 | A1 | 1/2018 | Tremblay et al. |
| 2018/0136469 | A1 | 5/2018 | Alexander et al. |

(Continued)

FOREIGN PATENT DOCUMENTS

WO 2018/005013 A1 1/2018

OTHER PUBLICATIONS

Advisory Action, U.S. Appl. No. 16/737,840, dated Jul. 2, 2021, 4 pages.

(Continued)

*Primary Examiner* — Jae N Noh
(74) *Attorney, Agent, or Firm* — Nicholson De Vos Webster & Elliott LLP; Judith Szepesi

(57) ABSTRACT

A system of eye tracking includes an infrared (IR) source to project IR light to an eye of a user, an IR holographic optical element (HOE) to change an angle of the IR light reflected from the eye of the user, and a sensor to receive the IR light. The system further includes a processor to use the IR light to determine a gaze vector of the user, in one embodiment.

20 Claims, 10 Drawing Sheets

(56) References Cited

U.S. PATENT DOCUMENTS

| | | |
|---|---|---|
| 2018/0196265 A1 | 7/2018 | Bouchier et al. |
| 2018/0284451 A1 | 10/2018 | Eash et al. |
| 2018/0321495 A1 | 11/2018 | Andrews et al. |
| 2019/0258062 A1 | 8/2019 | Aleem et al. |
| 2019/0317598 A1 | 10/2019 | Aleem et al. |
| 2019/0324532 A1 | 10/2019 | Aleem et al. |
| 2019/0384386 A1 | 12/2019 | Stafford |
| 2020/0092523 A1 | 3/2020 | Peuhkurinen |
| 2020/0142479 A1 | 5/2020 | Aleem et al. |
| 2020/0183173 A1 | 6/2020 | Eash et al. |
| 2020/0192284 A1 | 6/2020 | Kim et al. |
| 2020/0218346 A1 | 7/2020 | Eash et al. |
| 2020/0218348 A1 | 7/2020 | Eash et al. |
| 2020/0301146 A1 | 9/2020 | Kim et al. |

OTHER PUBLICATIONS

Final Office Action, U.S. Appl. No. 16/737,840, dated Apr. 15, 2021, 18 pages.
Non Final Office Action, U.S. Appl. No. 16/737,840, dated Oct. 6, 2020, 15 pages.
Notice of Allowance, U.S. Appl. No. 16/737,840, dated Aug. 20, 2021, 9 pages.
PCT Search Report PCT/US2020/012806, dated Apr. 2, 2020, 2 pages.
PCT Written Opinion PCT/US2020/012806, dated Apr. 2, 2020, 9 pages.

SENSOR-BASED EYE-TRACKING USING A HOLOGRAPHIC OPTICAL ELEMENT

RELATED APPLICATIONS

The present application is a continuation of U.S. application Ser. No. 16/737,840 filed on Jan. 8, 2020, which application claims priority to U.S. Provisional Patent Application No. 62/789,881 filed on Jan. 8, 2019, both of which are incorporated herein by reference in their entirety.

FIELD

The present invention relates to holographic optical elements (HOE) and more particularly to eye tracking using an HOE.

BACKGROUND

Near-eye displays have the competing requirements of displaying images at a high resolution, over a large field of view (FOV). Augmented reality displays attempt to position virtual elements in a real image. Because people's eyes are always in motion, this requires knowing where the user's eyes are looking.

Thus, eye tracking is useful in wearable devices, such as augmented reality glasses. Such eye tracking is used to determine where the user's gaze is pointing, as the user's eyes move. However, in wearable glasses, eye tracking can be difficult due to the physical limitations on where various elements may be positioned within the glasses. The more compact the virtual or augmented reality glasses are, the more limited the positions where display and eye tracking elements may be placed.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

In virtual reality and augmented reality systems, eye tracking uses infrared (IR) illumination, reflected from the user's eye to detect the gaze direction for a user. Using a holographic optical element (HOE) or holographic optical mirror provides volumetric savings, flexibility, and a flat form factor. It also provides a selected angle of reflection, which is useful in wearable configurations. In one embodiment, the IR uses flood illumination, and the IR image data is captured via an IR image sensor, which captures the entire IR image. In one embodiment, multiple IR light sources are used for flood illumination. In one embodiment, the IR image sensor captures a reflection from an IR light source(s) used to illuminate the eye. In one embodiment, the IR light source is a fixed light source relative to the head mounted display. This means that data about the eye position can be acquired continuously and independently of the frame rate of the underlying display system. In one embodiment, the IR image sensor is an array of pixels.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized, and that logical, mechanical, electrical, functional and other changes may be made without departing from the scope of the present invention. The following detailed description is, therefore, not to be taken in a limiting sense, and the scope of the present invention is defined only by the appended claims.

Figure 1:
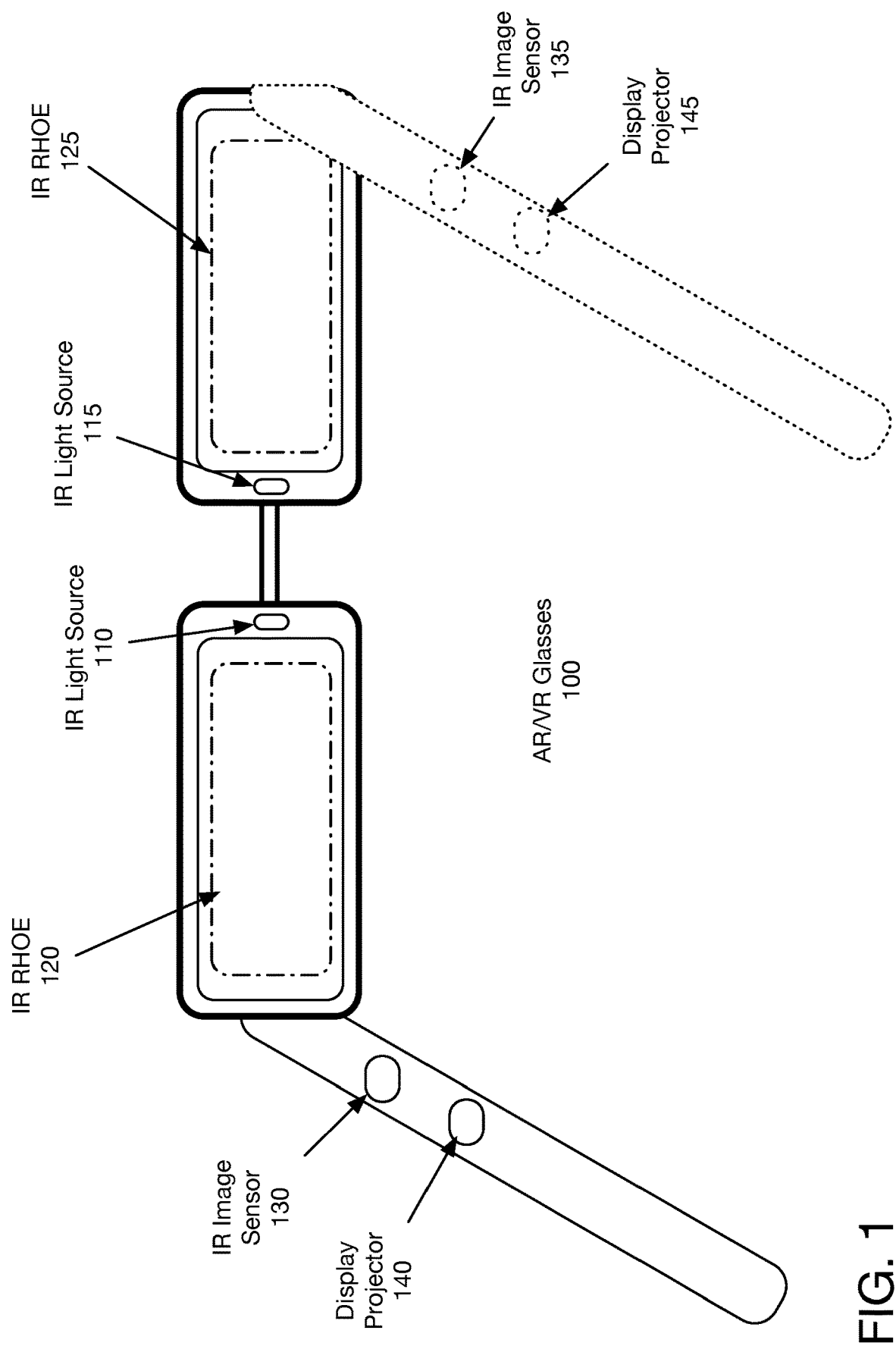
FIG. 1 is a diagram of one embodiment of a wearable device in which the holographic optical element (HOE) may be used.

FIG. 1 is a diagram of one embodiment of a wearable device in which the holographic optical element (HOE) may be used. In one embodiment, the wearable device 100 is a pair of augmented reality (AR) or virtual reality (VR) glasses. Such AR and/or VR glasses can be used to project images into the user's eyes. In AR configurations, the user additionally can see through the glasses and can perceive their environment.

The IR light source 110/115 directs IR light to the user's eyes. In one embodiment, the IR light source 110/115 is a fixed, non-moving, light source built into the AR/VR glasses 100. In one embodiment, the IR light source 110/115 comprises one or more light emitting diodes (LEDs) to illuminate the eye. The IR light is reflected from the user's eyes and is not visibly perceivable by the user.

In one embodiment, an IR image sensor 130/135, which receives the IR light reflected from the eye, is positioned in each arm of the glasses 100. Other positions may be used for the IR image sensor 130/135. In order for the IR image sensor 130/135 to receive the IR light reflected from the user's eye, something must be used to direct the IR signal to the IR image sensor 130/135. The IR reflective holographic optical element 120/125 of the present application may be used to enable such direction of the IR signal. The IR reflective holographic optical element 120/125 may be placed on the glass lenses. The IR reflective holographic optical element 120/125 may include a transmissive HOE or a reflective HOE. If the holographic optical element 120/125 is transmissive, in one embodiment the system includes a hot mirror which is reflective to IR signal (not shown). Thus, the IR reflective holographic optical element 120/125 reflects the IR signal from the user's eye to the IR image sensor 130/135. In one embodiment, the IR image sensor is an array of pixels. In one embodiment, the IR image sensor 130/135 is a small CMOS (complementary metal oxide semiconductor) or CCD (charge coupled device) imaging array or photodiode array, used to capture an image of an area of the eye, which includes some of the visible features.

The display projector 140/145 in one embodiment projects image data to the eyes of the user. In one embodiment, the image data may also be reflected by a mirror or visible light HOE, as will be described below. In one embodiment, the present system may also be used with a steerable display. A steerable display permits the positioning of display to direct a high resolution image to the user's fovea. The gaze detection data obtained based on the data from the IR image sensor 130/135 thus may be used by a steerable display projector. In one embodiment, the steerable display described in U.S. Pat. No. 10,514,546, issued on Dec. 24, 2019, which is incorporated herein by reference, is utilized.

The data captured by the IR image sensor 130/135 is processed to determine the gaze vector of the user.

Figure 2:
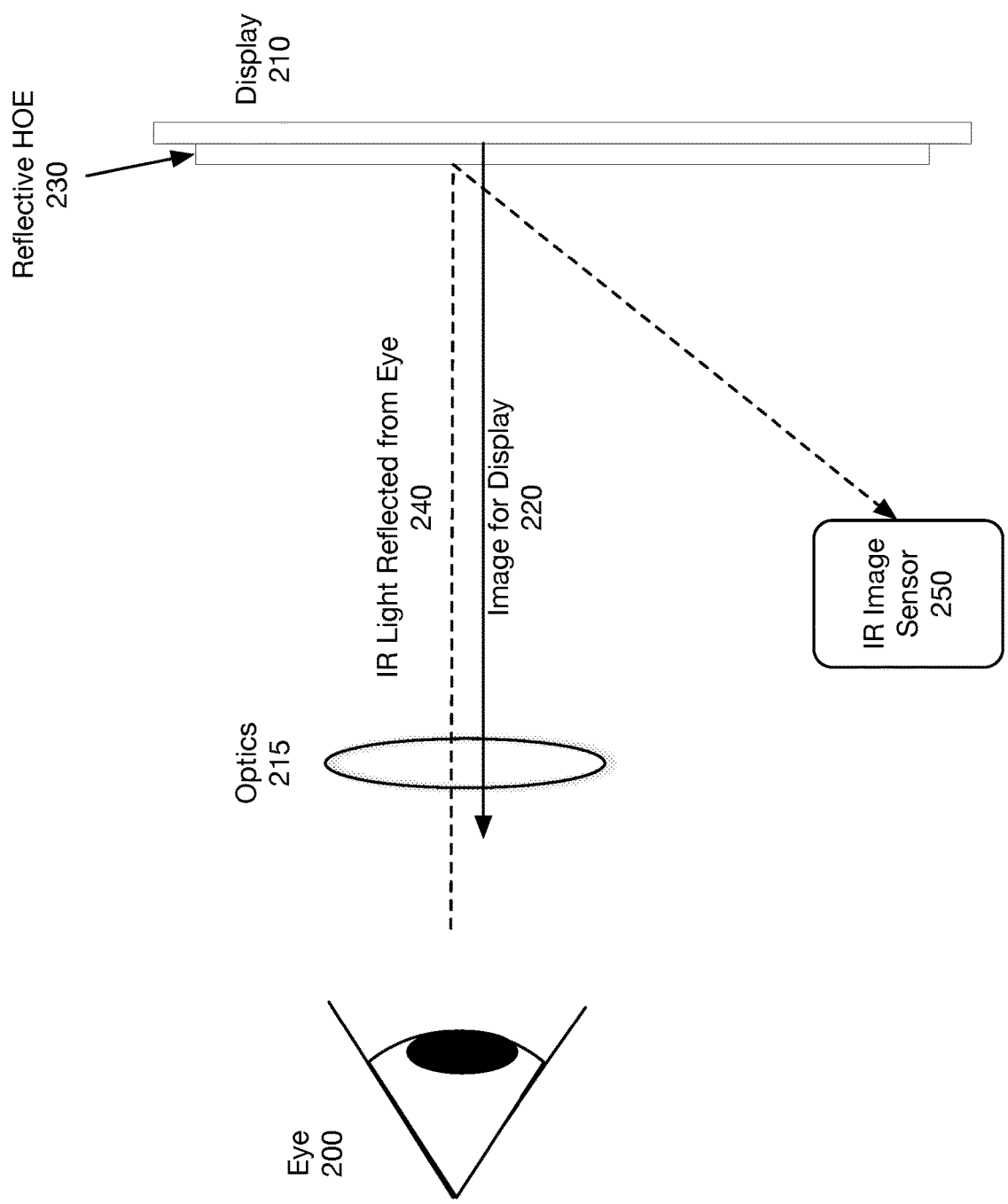
FIG. 2 is a diagram of one embodiment of an eye tracking system using a holographic optical element (HOE).

FIG. 2 is a diagram of one embodiment of an eye tracking system using an infrared reflective holographic optical element (HOE). The system in one embodiment includes a display 210, such as OLED display 210, which projects an image for display 220 to the user's eye 200. Optics 215 are used to focus the image. In one embodiment, the display optics 215 are AR coated. In one embodiment, the optics 215 may include a lens, pancake lens, Fresnel lens, or another type of optical element.

Additionally, the system includes a reflective holographic optical element (HOE) 230. The infrared light reflected from the user's eye 200 is reflected by the HOE 230 to IR image sensor 250. In one embodiment, IR image sensor 250 may be a sensor, a photosensor, a photodiode, a charged coupled device (CCD), or another sensor to capture the IR light 240. The captured IR light 240 is used to determine the gaze vector of the user by a processor (not shown). In one embodiment, the HOE 230 is a film on display 210.

In one embodiment, the reflective HOE 230 may be positioned directly in front of the display 210. In one embodiment, the HOE 230 is transparent to visible light, and reflective to IR. This enables the use of this configuration for augmented reality. In one embodiment, the HOE is a thin film. In one embodiment, the HOE 230 may be a polymer. In one embodiment, the HOE 230 may be a mixture of polymer and liquid crystal materials. In one embodiment, the HOE 230 has a thickness of 5 µm. In one embodiment, the HOE has a maximum thickness of 200 µm. In one embodiment, the HOE 230 is a thin film applied directly to the display 210. In another embodiment, the HOE is applied to a transparent substrate. In one embodiment, the HOE 230 changes the angle of the light passing through it, or reflected by it, by a specific degree. In one embodiment, the change in the angle is between 20 and 45 degrees. In one embodiment, the substrate may be curved. In one embodiment, the HOE is polarization selective.

Figure 3:
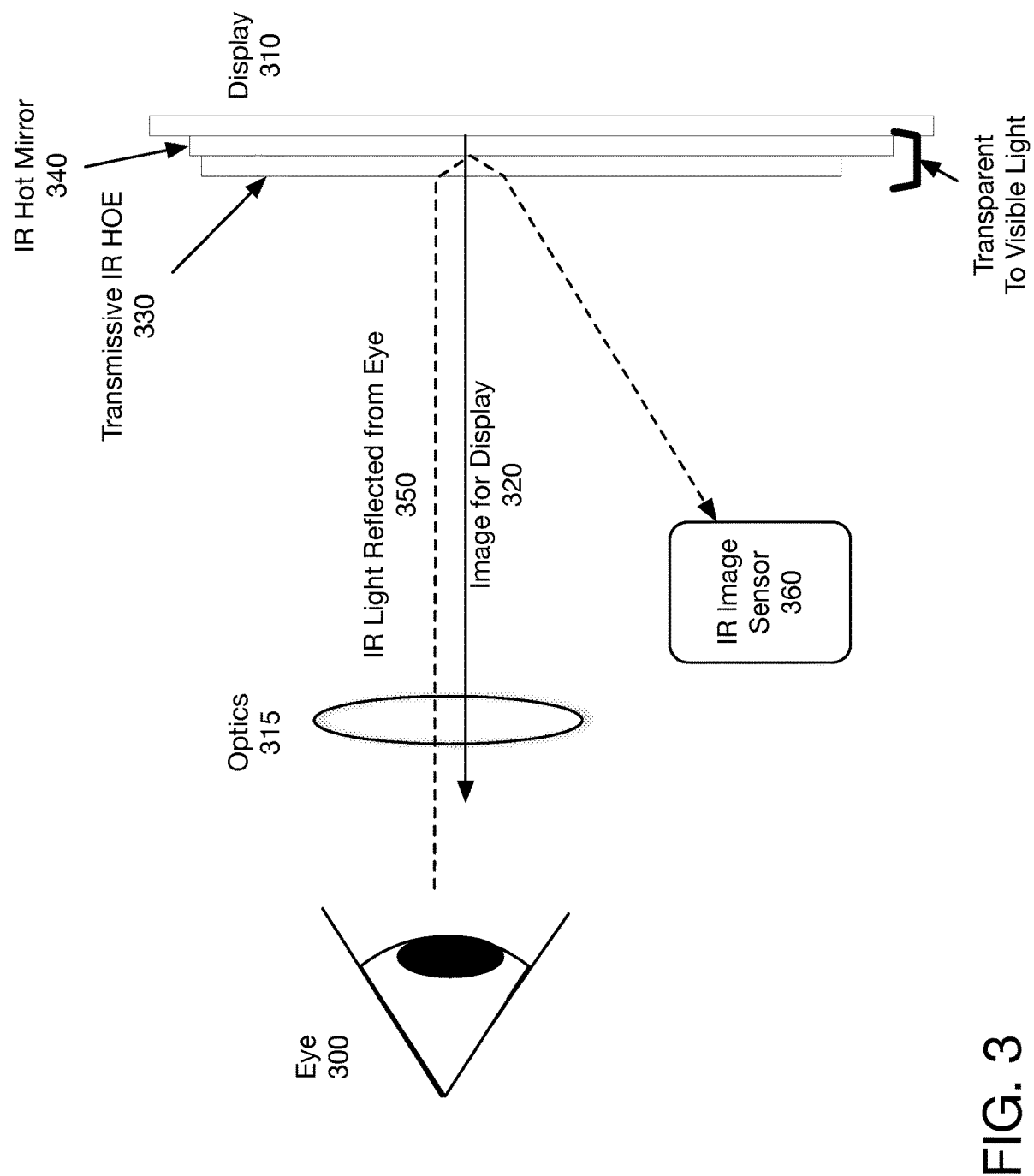
FIG. 3 is a diagram of one embodiment of an eye tracking system using a holographic optical element (HOE).
Figure 9:
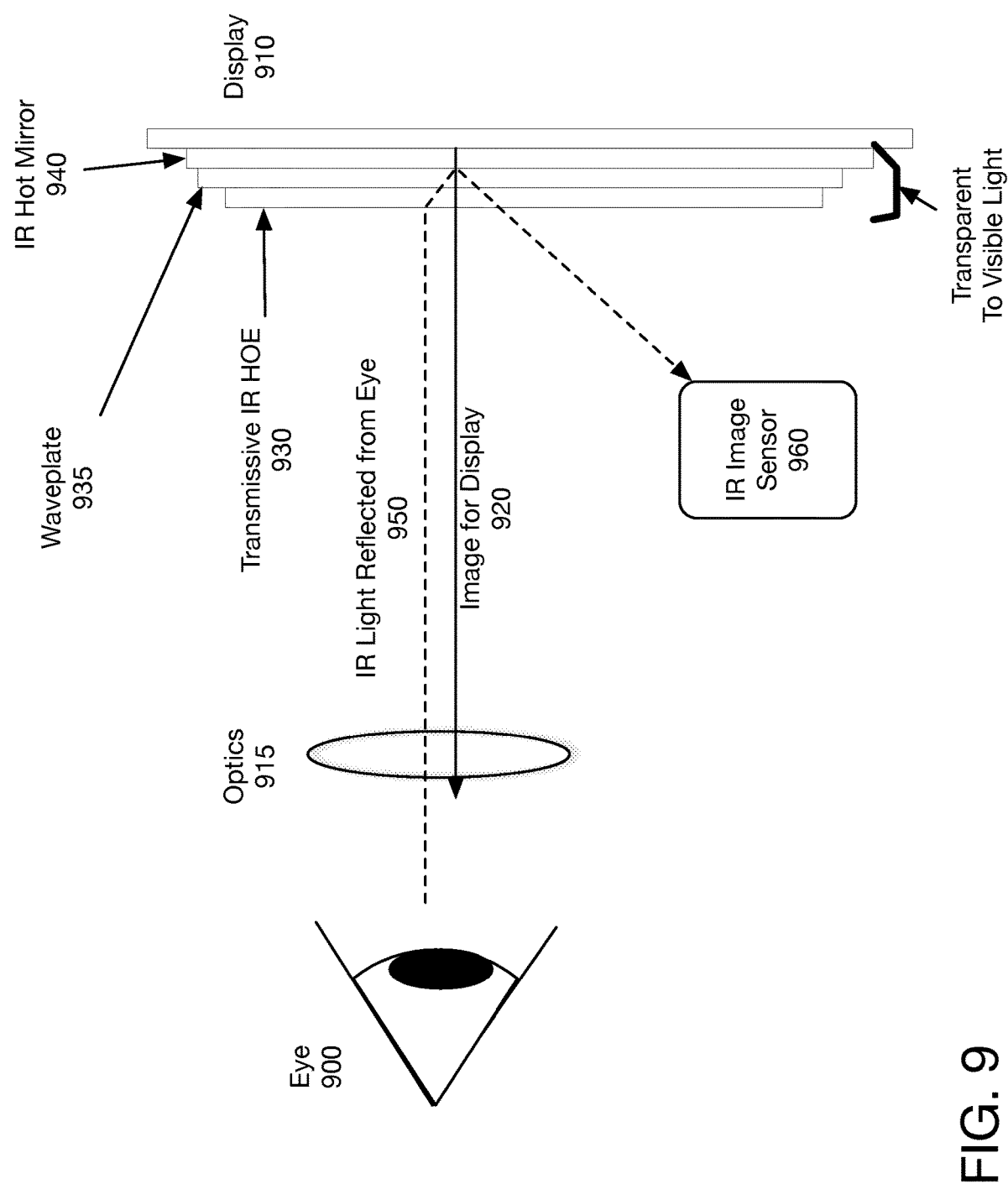
FIG. 9 is a diagram of one embodiment of an eye tracking system using a holographic optical element (HOE) and a wave plate.

FIG. 3 is a diagram of one embodiment of an eye tracking system using an IR holographic optical element (HOE). In this configuration, instead of a reflective HOE, a transmissive HOE 330 is used, with an associated IR hot mirror 340. The IR hot mirror 340 reflects the IR light from the eye 350, to the IR image sensor 360. The transmissive HOE 330 is used to change the angle of reflection for the IR signal 350. In one embodiment, the HOE 330 changes the angle twice, once when the IR signal passes through the HOE 330 from the user's eye 300, and once when the reflected IR signal passes through the HOE 330 to the sensor 360. In one embodiment, the angle of reflection for the HOE is between 0 and 50 degrees in one direction, and 0 and 50 degrees in the other direction. In one embodiment, the angle of deflection of the two directions is identical. In one embodiment, a wave plate is used to change the polarization state of the light interacting with the transmissive HOE. After reflecting off the IR mirror, in one embodiment the IR light is not deflected by the HOE a second time. This is illustrated in FIG. 9 below.

The hot mirror 340 reflects the IR light from the eye 350 as any normal mirror would. In this configuration also, there is a display 310 in line with the user's eye, which transmits an image for display 320 through the hot mirror 340 and HOE 330, and through optics 315. In one embodiment, the display 310 is an LCD or OLED display. Both the hot mirror 340 and HOE 330 are transmissive to visible light.

As can be seen in FIG. 2 and FIG. 3, a reflective HOE can be replaced by a transmissive HOE and hot mirror. In one embodiment, the element which changes the angle of the incident IR signal and reflects the IR signal may be referred to as an IR reflective holographic optical element (RHOE). The RHOE may be an angle changing transmissive HOE coupled with a hot mirror or a reflective HOE.

Figure 4:
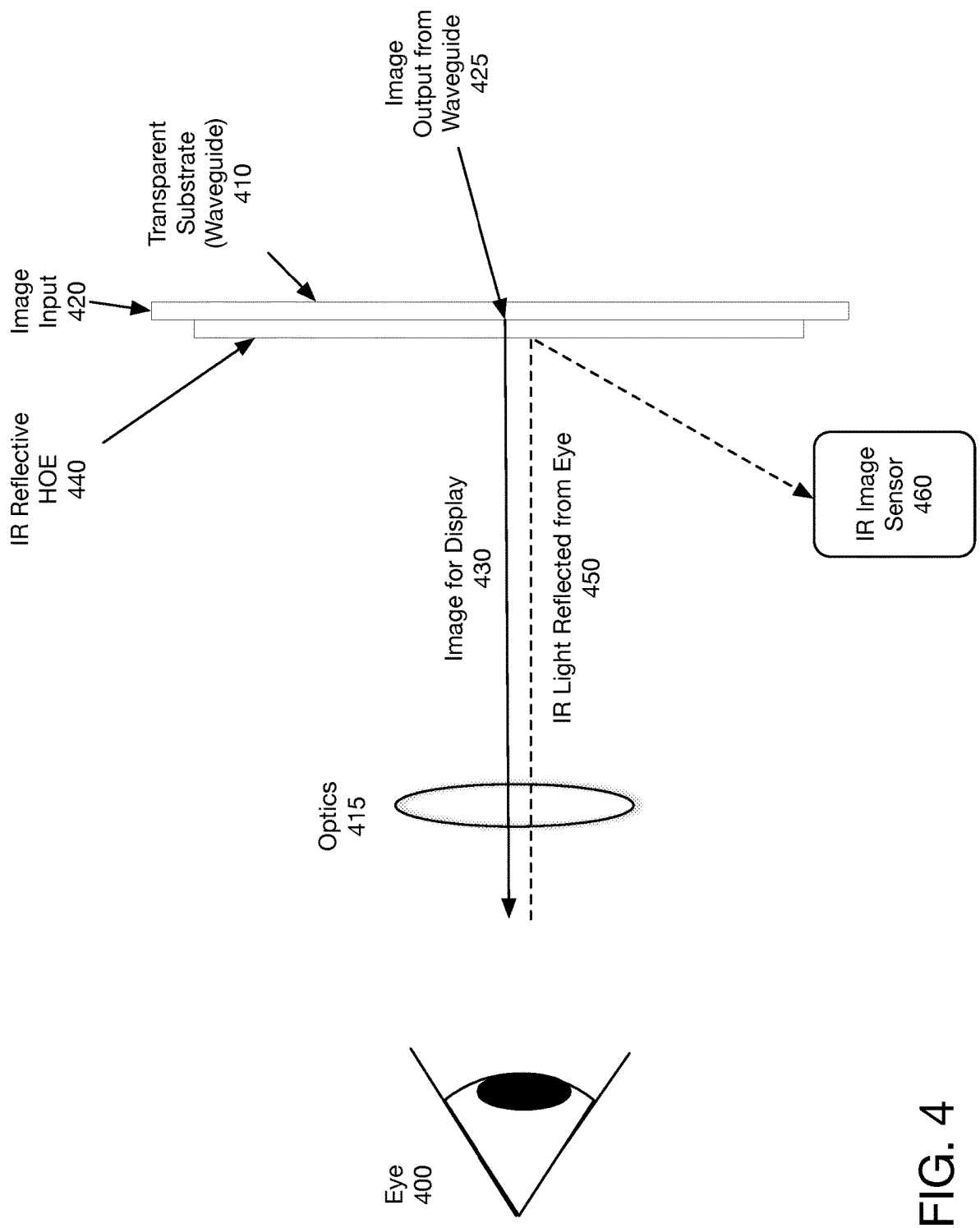
FIG. 4 is a diagram of one embodiment of an eye tracking system using a holographic optical element (HOE).

FIG. 4 is a diagram of one embodiment of an eye tracking system using a holographic optical element (HOE). In this configuration, the display is not in line of sight to the user's eye 400, but rather the image input 420 is input into a waveguide 410. The HOE 440 is applied to a transparent substrate 410, in one embodiment. In one embodiment, the HOE 440 is applied directly to the waveguide 410. This enables an image to be input 420 into the waveguide 410. The image output 425 of the waveguide 410 is the image for display 430 to the user, which passes through optics 415 before reaching the user's eye 400. The reflective HOE 440 reflects the IR light from the eye 450 to IR image sensor 460. In one embodiment, this configuration may also be altered by replacing the reflective HOE 440 with a transmissive HOE coupled with a hot mirror.

Figure 5:
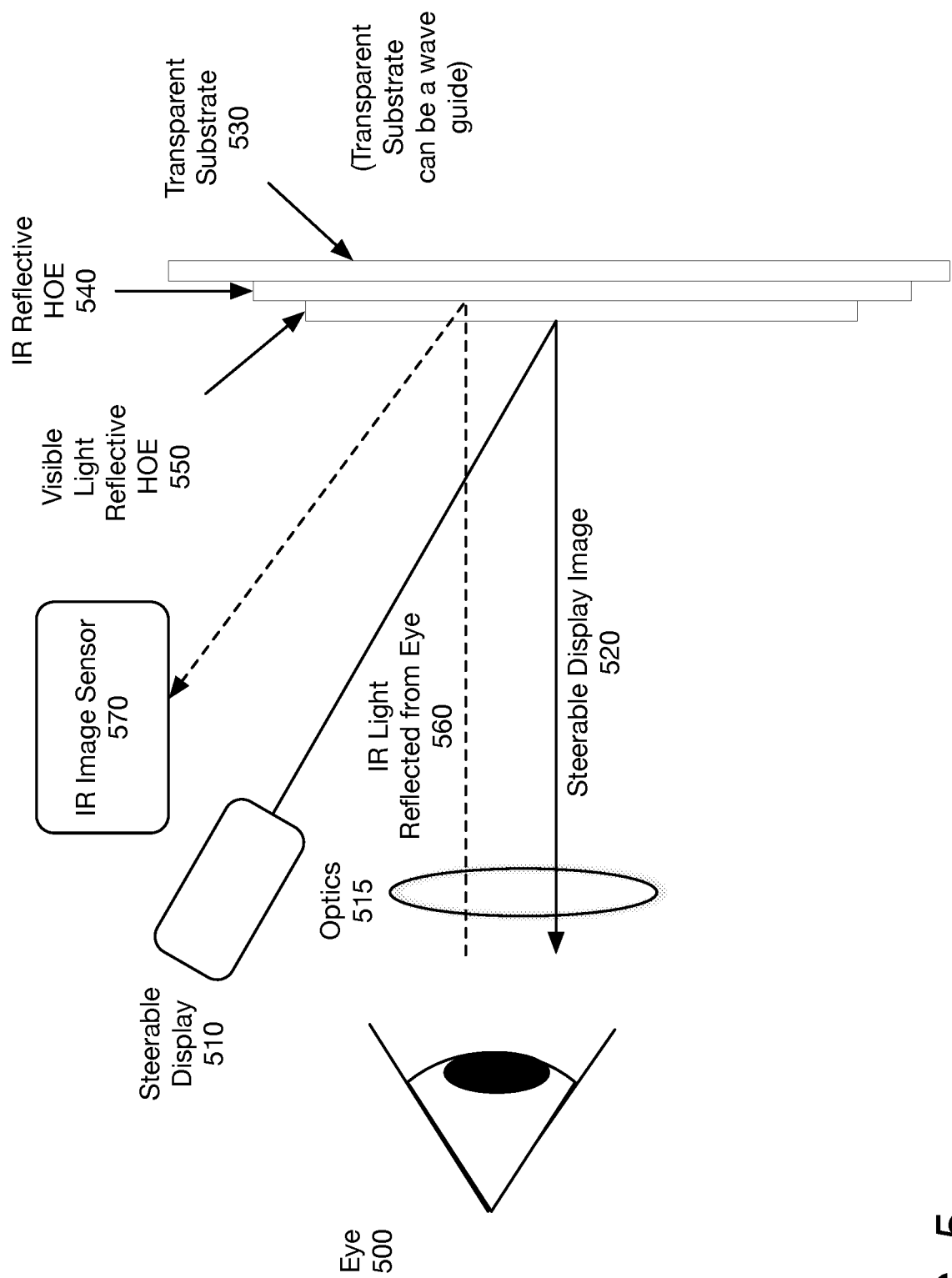
FIG. 5 is a diagram of one embodiment of an eye tracking system using a holographic optical element (HOE).

FIG. 5 is a diagram of one embodiment of an eye tracking system using a holographic optical element (HOE). In this configuration, a steerable display image 520 for display to the user is projected by a steerable display 510, rather than an OLED or similar display. The steerable display 510 projects the image 520 toward a visible light reflective HOE 550. The steerable display 510 in one embodiment is a mini-projector system including optics. The visible light reflective HOE 550 reflects the image data 520, to the user's eye through optics 515. The visible light HOE 550 is on a transparent substrate 530, in one embodiment.

Additionally, an IR reflective HOE 540 reflects the IR light from the eye 560 to the sensor 570. In one embodiment, the ordering of the visible light reflective HOE 550 and the IR reflective HOE 540 is arbitrary. In one embodiment, one or both reflective HOEs 540/550 may be replaced with transmissive HOEs, utilizing a hot mirror behind the transmissive HOE. In one embodiment, one mirror may be used to reflect both the IR light reflected from the eye and the steerable display image 520 reflected to the eye from the steerable display 510. In another embodiment, an IR mirror transmissive to visible light may be used to reflect the IR light from the eye, and a partially transmissive visible light mirror may be used to reflect the steerable display image 520. In one embodiment, the IR reflective HOE 540 and visible light reflective HOE 550 may be combined into a single HOE which reflects both visible and IR light.

In one embodiment, the transparent substrate 530 supports the IR reflective HOE 540 and the visible light reflective HOE 550. In one embodiment, transparent substrate 530 may be a waveguide. In one embodiment, the waveguide 530 may additionally project visible image data to the user's eye 500. In this configuration, the user may be receiving two separate images, the image from the waveguide 530 and from the steerable display 510. In one embodiment, these two images are complementary, as described in U.S. Pat. No. 10,514,546, issued on Dec. 24, 2019, which is incorporated herein by reference.

Figure 6:
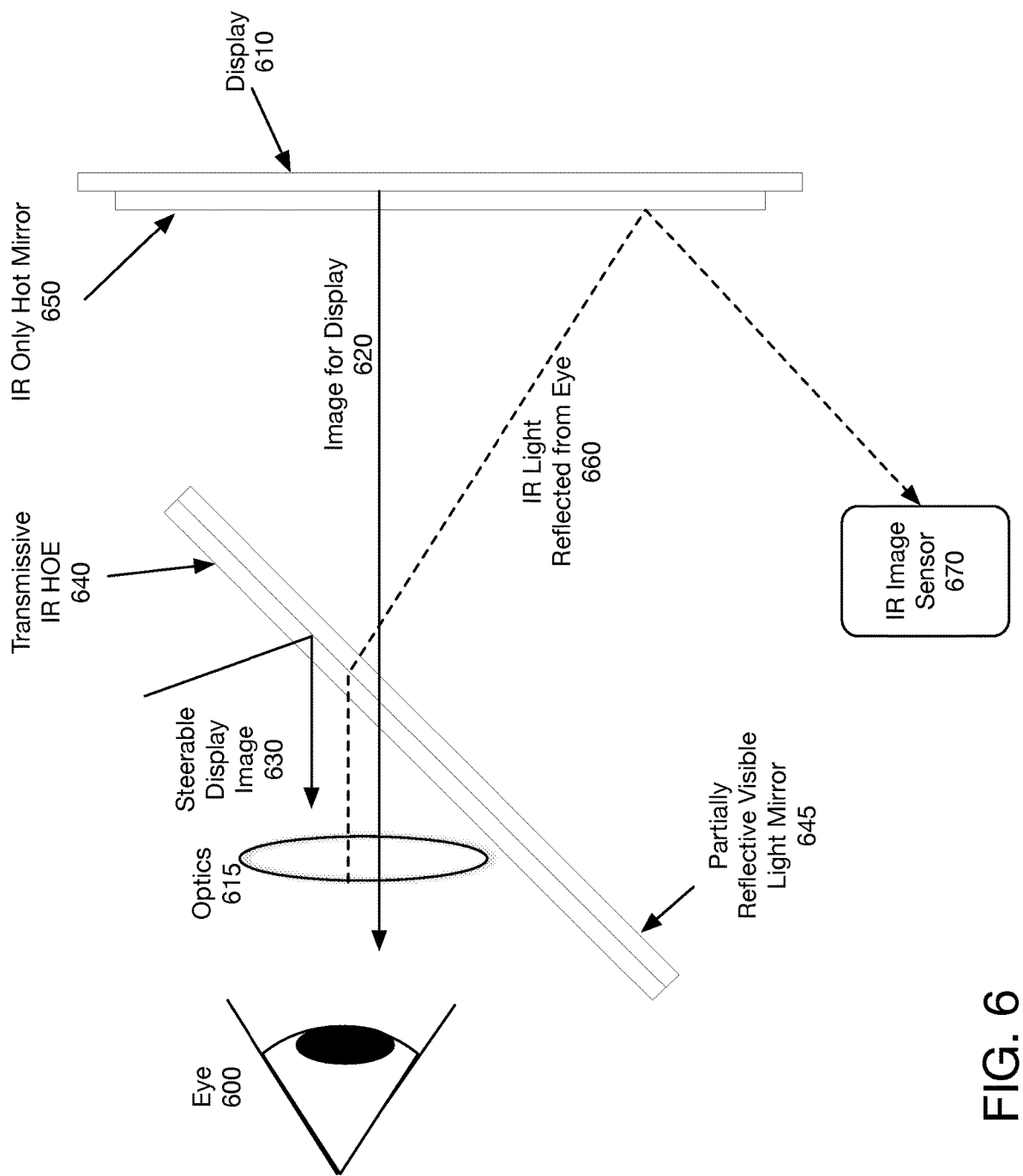
FIG. 6 is a diagram of one embodiment of an eye tracking system using a holographic optical element (HOE).

FIG. 6 is a diagram of one embodiment of an eye tracking system using a holographic optical element (HOE) with a steerable display. In this configuration, instead of the HOE being parallel to the display and/or hot mirror, a transmissive IR HOE 640 is at an angle to the display, and to the user's line of sight. In one embodiment, the transmissive IR HOE 640 is on an IR transparent substrate 645 and is positioned at an angle between 30 and 60 degrees from the vertical. In one embodiment, the angle of the HOE 640 is 45 degrees. In one embodiment, the substrate 645 is a partially reflective visible light mirror.

In this configuration, the display 610 projects an image for display 620 to the user's eye, through optics 615. A transmissive IR HOE 640 changes the angle of the IR light reflected from the eye 660, which is reflected by a hot mirror 650 to the IR image sensor 670. The HOE 640 is also transmissive to visible light in the other direction, coming from display 610 to the user's eye.

The partially reflective visible light mirror 645 reflects the steerable display image 630 to the user's eye. The partially reflective visible light mirror 645 is transmissive to visible light in the other direction, coming from display 610 to the user's eye. Thus, the eye 600 receives two images, image for display 620 from the display 610 and steerable display image 630 from the steerable display (not shown).

Figure 7:
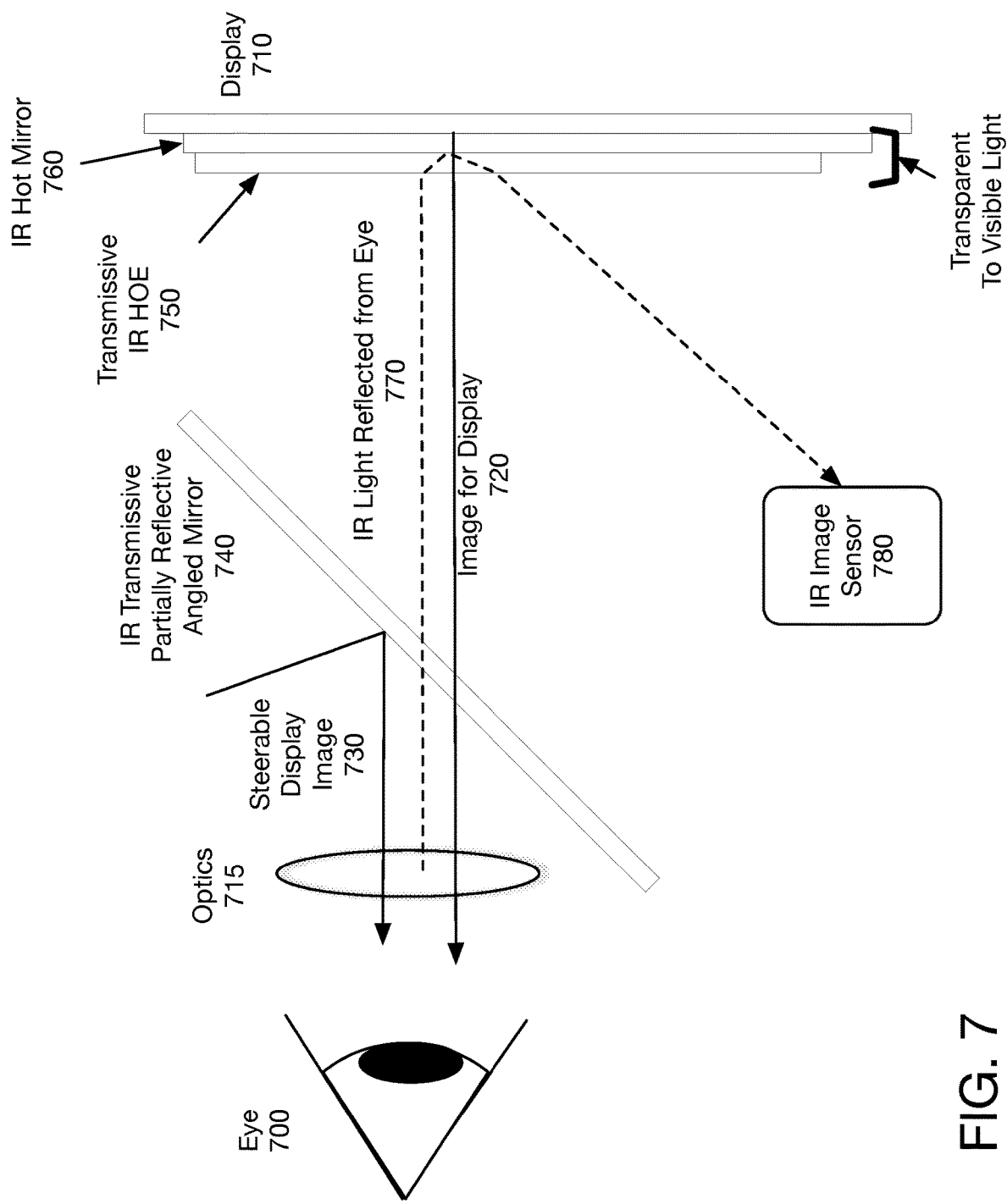
FIG. 7 is a diagram of one embodiment of an eye tracking system using a holographic optical element (HOE).

FIG. 7 is a diagram of one embodiment of an eye tracking system using a holographic optical element (HOE). In this configuration, an angled IR transmissive partially reflective mirror 740 is placed between the user's eye 700 and the display 710. The display 710 projects the image for display 720 to the user's eye 700, through optics 715. A steerable display image 730 is reflected by the angled IR transmissive partially reflective mirror 740 to the user's eye 700 as well.

The angled IR transmissive partially reflective mirror 740 is reflective to visible light in one direction, and transmissive to visible image data in the other direction. It is also transmissive to IR. Thus, both IR signal 770 and image for display 720 pass through the IR transmissive partially reflective angled mirror 740.

Figure 8:
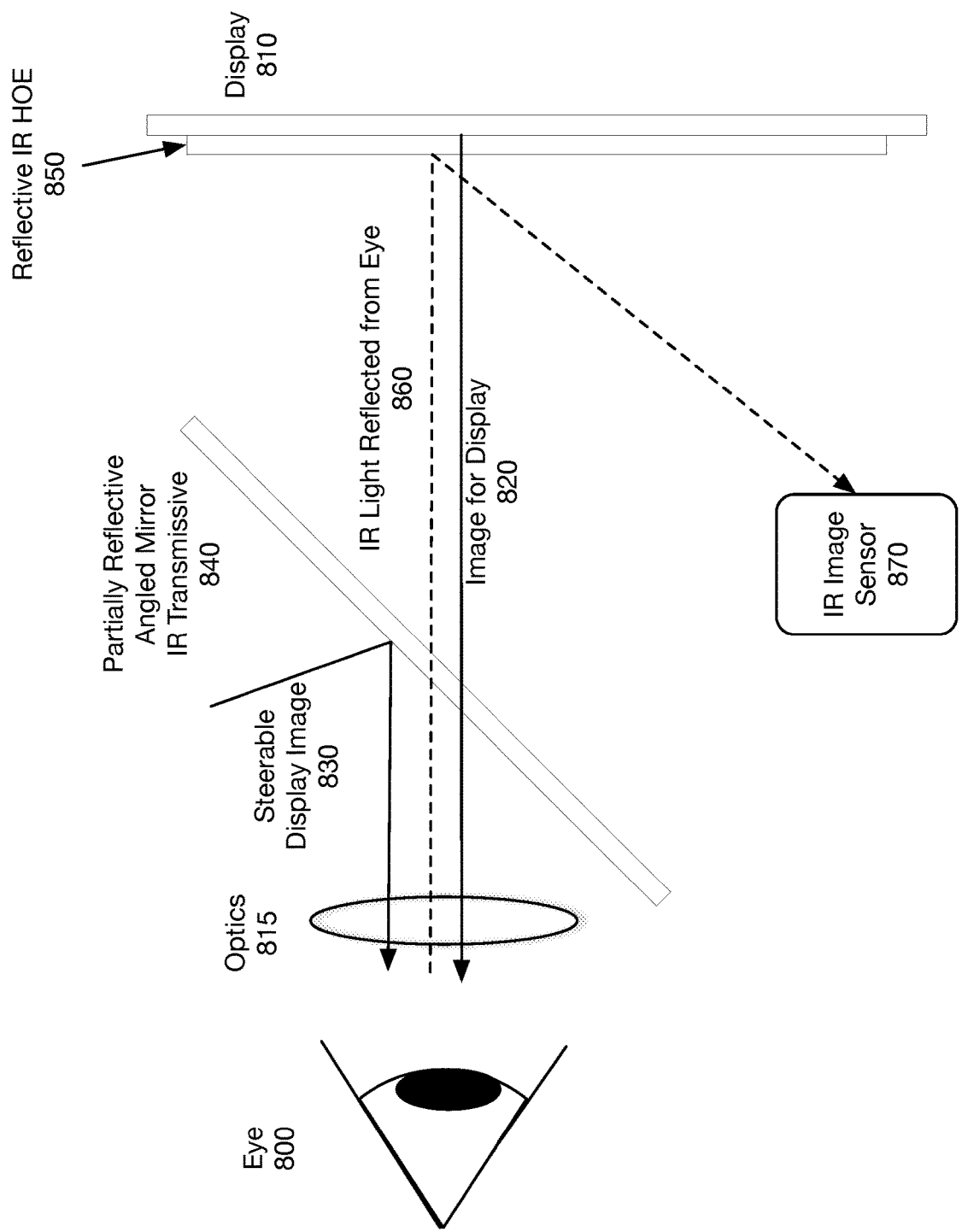
FIG. 8 is a diagram of one embodiment of an eye tracking system using a holographic optical element (HOE).

In this example, transmissive HOE 750 is coupled with hot mirror 760 to reflect the IR light from the eye 770 to sensor 780. As noted previously, a transmissive HOE and hot mirror can be replaced by a reflective HOE with no hot mirror. This is illustrated in FIG. 8.

FIG. 9 is a diagram of one embodiment of an eye tracking system using a holographic optical element (HOE) and a wave plate. In this configuration, instead of a reflective HOE, a transmissive HOE 930 is used, with an associated IR hot mirror 940. In this embodiment, the transmissive HOE 930 is polarization sensitive, and changes the angle of the IR light only when the IR light has a particular polarization. In one embodiment, the HOE 930 changes the angle of the light that has linear polarization.

The IR hot mirror 940 reflects the IR light 950 from the eye 900, to the IR image sensor 960. The transmissive HOE 930 is used to change the angle of reflection for the IR light 950.

In one embodiment, the HOE 930 changes the angle of the IR light from the user's eye 950, when the IR light passes through the HOE 930 from the user's eye 900. In one embodiment, the angle of deflection by the HOE 930 is between 0 and 50 degrees. In one embodiment the incoming light is linearly polarized. In another embodiment the incoming light is circularly polarized.

The IR light 950 then passes through a wave plate 935, which changes the polarization of the IR light. In one embodiment the wave plate is a quarter-wave plate, which converts linearly polarized light into circularly polarized light and vice versa. The light with the changed polarization state is reflected by the IR mirror 940 and passes through the wave plate a second time. When the reflected IR light, with the changed polarization, passes through the HOE 930 again, toward sensor 960, the IR light is not deflected by the HOE a second time, and the angle does not change.

In one embodiment, the IR light may be deflected after the polarization change, if the initial IR light is polarized so the HOE does not deflect it. In one embodiment, the HOE does deflect the light following its reflection from the hot mirror and the change in its polarization state due to the wave plate.

In one embodiment, any configuration using a transmissive HOE through which the IR light passes twice may be used with a wave plate to change the polarization of the IR light, so that the HOE deflects only the light traveling in one direction.

In this configuration, there may also be a display 910, which transmits an image for display 920 through the hot mirror 940, waveplate 935, HOE 930, and optics 915. The hot mirror 940, waveplate 935, and HOE 930 are transmissive to visible light.

Figure 10:
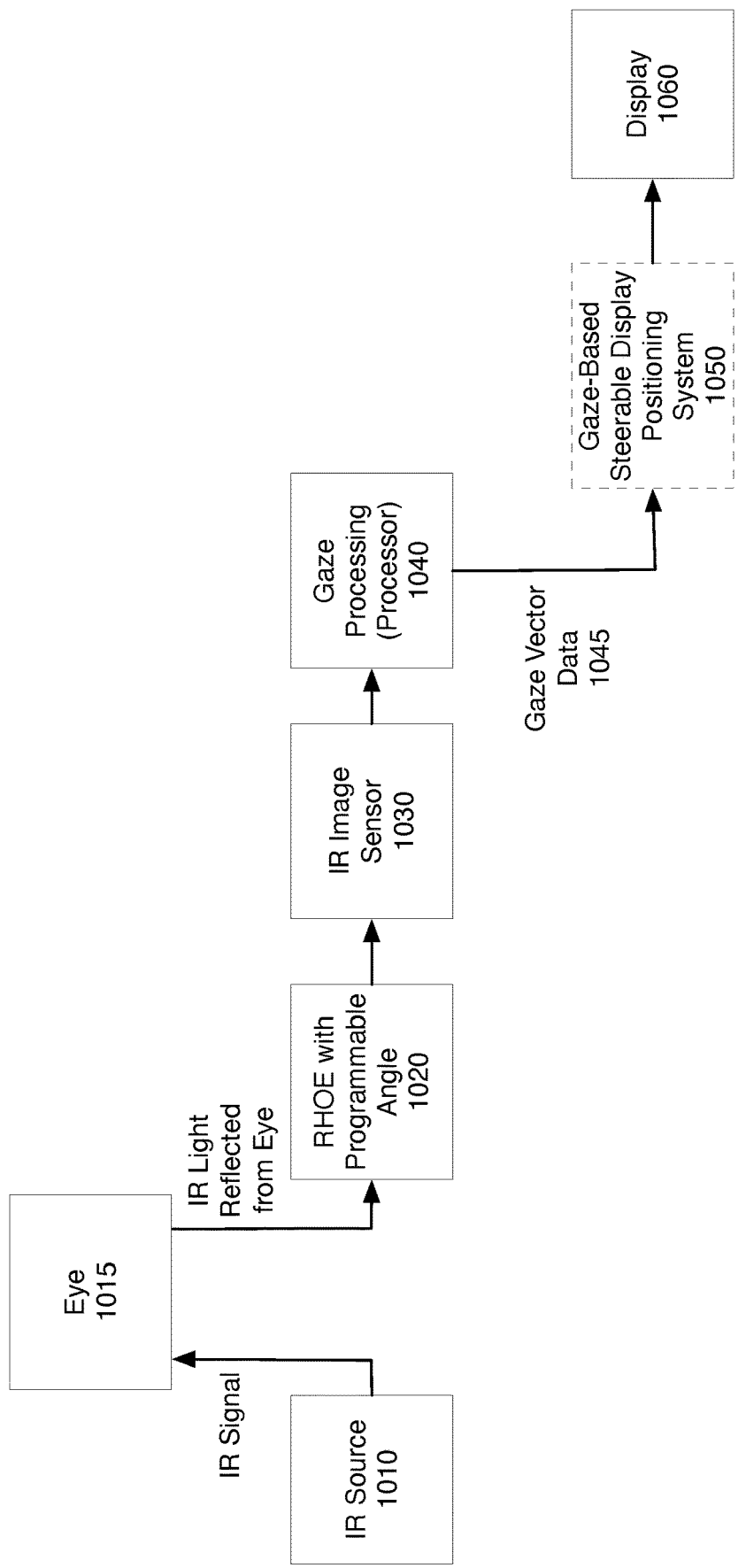
FIG. 10 is a block diagram of one embodiment of an eye tracking system using a holographic optical element (HOE) and a wave plate.

FIG. 10 is a block diagram of one embodiment of an HOE system. The block diagram shows the IR source 1010, which in one embodiment is one or more infrared light emitting diodes (LEDs). The IR signal is directed to the user's eye 1015 and is reflected from the user's eye 1015. The IR light reflected from the eye impacts an IR reflective holographic optical element (RHOE) with a selected angle of reflection 1020. As noted above, the RHOE 1020 may be a reflective HOE or may be a transmissive HOE coupled with a hot mirror. The reflective angle of the HOE is programmed at the time of its design, based on the positioning of the IR source 1010 and the IR image sensor 1030 in the VR/AR goggles. The light is reflected to an IR image sensor 1030. The IR image sensor 1030 captures the light, and the angle of the light. The IR image sensor 1030, in one embodiment, captures an image of a portion of the eye. This data is passed to gaze processing 1040. The gaze processing 1040 determines the gaze vector of the user. In one embodiment, the gaze processing is done by a processor. In one embodiment, the processor may be built into the AR/VR goggles. In another embodiment, the processor may be remote. In one embodiment, the gaze processing utilizes relative eye tracking, in which the IR sensors sample a portion of the reflection from the eye at a high sampling rate and the processor calculates relative motion based on data from that small area. Utilizing such relative motion tracking in a small field of view provides good accuracy at a low power consumption and cost. In one embodiment the relative eye tracking system described in co-pending application U.S. patent application Ser. No. 16/517,443, filed on Jul. 19, 2019 may be used with this system. The processor 1040 calculates the gaze vector data 1045.

The gaze vector data 1045 is in one embodiment passed to a gaze-based positioning system 1050. In one embodiment, the gaze based positioning system 1050 moves a steerable display 1060 to project visual image data to the user's fovea, or another determined position with respect to the user's gaze. In other embodiments, the gaze vector data 1045 is used for user interface navigation, selective display, etc.

In this way, the system can obtain gaze data from a user, using an IR Reflective HOE, which may be built into a wearable device such as glasses or goggles. This is useful in both virtual reality and augmented reality systems, to provide visual data to the user.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A system of eye tracking comprising:
   a transparent substrate to act as a wave guide, the transparent substrate to receive image data for projection to a user;
   an infrared (IR) light source to project IR light to an eye of the user;
   an IR holographic optical element (HOE) to receive the IR light reflected from the eye of the user, the reflected IR light representing an image of a portion of the eye of the user, the HOE configured to change an angle of the reflected IR light and direct the reflected IR light to a second optical element; and
   an IR image sensor to receive the reflected IR light from the second optical element, the reflected IR light used to determine a gaze vector of the user.

2. The system of claim 1, wherein the HOE is a transmissive HOE, and the second optical element is an IR hot mirror to reflect the IR light received from the HOE, the IR hot mirror transmissive to visible light.

3. The system of claim 1, further comprising:
   a display element to project visible light to the eye of the user;
   wherein the HOE is positioned in parallel with and in front of the display element.

4. The system of claim 1, further comprising:
   wherein the HOE is an IR reflective HOE positioned on the transparent substrate.

5. The system of claim 1, further comprising:
   a steerable display;
   a visible light HOE to direct visible light from the steerable display to the eye of the user.

6. The system of claim 5, wherein the IR HOE and the visible HOE are positioned in front of a display and are transmissive to a display image.

7. The system of claim 1, further comprising:
   the second optical element comprising an IR hot mirror positioned in parallel to a display element;
   wherein the IR HOE is a transmissive IR HOE, and the IR HOE is positioned at an angle to the IR hot mirror, such that the IR HOE redirects the IR light to the IR hot mirror, which directs the IR light to the IR image sensor.

8. The system of claim 7, further comprising:
   a steerable display;
   the transmissive IR HOE being reflective to visible light, and the transmissive IR HOE reflecting image data from the steerable display to the eye of the user.

9. The system of claim 1, further comprising:
   an angled mirror positioned at an angle to the IR HOE, the angled mirror transmissive to the IR light; and
   a steerable display;
   the angled mirror reflecting the image data from the steerable display to the eye of the user.

10. The system of claim 1, further comprising:
    a steerable display; and
    a gaze-based positioning system to point the steerable display to a fovea of the user, based on the determined gaze vector.

11. The system of claim 1, wherein the IR image sensor is an array of pixels.

12. The system of claim 1, further comprising:
    a processor to utilize data from the IR image sensor to calculate the gaze vector.

13. The system of claim 12, wherein the IR image sensor samples a portion of a reflection from the eye at a high sampling rate, and the processor calculates relative motion based on the sampling.

14. The system of claim 1, wherein the IR light source provides flood illumination, and the IR image sensor captures an entire IR image.

15. The system of claim 1, wherein the IR light source comprises a plurality of light sources.

16. The system of claim 1, wherein the system is a head mounted display, and the IR light source is fixed relative to the head mounted display.

17. A head mounted display comprising:
    an infrared (IR) light source fixed with respect to the head mounted display to project IR light to an eye of a user, the IR light source to apply flood illumination to the eye;
    an IR holographic optical element (HOE) to receive light reflected from the eye of the user representing an image of a portion of the eye, the HOE configured to change an angle of the IR light reflected from the eye of the user; and
    an IR image sensor to capture [[r]} the IR light reflected from the eye of the user, the IR light reflected from the eye of the user used,
    to determine a gaze vector of the user.

18. The head mounted display of claim 17, wherein:
    the IR sensor captures a portion of the reflection from the eye at a high sampling rate; and
    a processor calculates relative motion based on the sampling, and calculates the gaze vector based on the relative motion.

19. A system including eye tracking comprising:
    a display element to project visible light to the eye of a user;
    a steerable display to moveably position a two-dimensional image within a viewable area;
    a visible light HOE to direct visible light from the steerable display to the eye of the user;
    an infrared (IR) light source to project IR light to an eye of a user without using a holographic optical element (HOE);
    an IR holographic optical element (HOE) to receive light reflected from the eye of the user representing a portion of the eye, and change an angle of the reflected IR light, wherein the HOE is positioned in parallel with and in front of the display element; and
    an IR image sensor to receive the reflected IR light, the reflected IR light used to determine a gaze vector of the user.

20. The system of claim 19, further comprising:
    an IR hot mirror positioned in parallel to a display element;
    wherein the HOE is a transmissive HOE, and the HOE is positioned at an angle to the IR hot mirror, such that the HOE redirects the reflected light to the IR hot mirror, which directs the reflected light to the IR image sensor.

* * * * *

UNITED STATES PATENT AND TRADEMARK OFFICE
CERTIFICATE OF CORRECTION

PATENT NO. : 11,550,388 B2
APPLICATION NO. : 17/449942
DATED : January 3, 2023
INVENTOR(S) : Aaron Matthew Eash et al.

Page 1 of 1

It is certified that error appears in the above-identified patent and that said Letters Patent is hereby corrected as shown below:

In the Claims

Claim 17, Column 8, Line 32, after "to capture", delete "[[r]]}".

Signed and Sealed this
Fifth Day of December, 2023

Katherine Kelly Vidal
*Director of the United States Patent and Trademark Office*